United States Patent
Edgett et al.

(10) Patent No.: US 7,539,862 B2
(45) Date of Patent: *May 26, 2009

(54) METHOD AND SYSTEM FOR VERIFYING AND UPDATING THE CONFIGURATION OF AN ACCESS DEVICE DURING AUTHENTICATION

(75) Inventors: Jeff Steven Edgett, Sunnyvale, CA (US); Barbara Nelson, San Mateo, CA (US); John Robert Vollbrecht, Dexter, MI (US); Roy David Albert, San Jose, CA (US); James Marion Underwood, Pleasanton, CA (US); Blair Thomas Bullock, Pleasanton, CA (US)

(73) Assignee: iPass Inc., Redwood Shores, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 10/821,313

(22) Filed: Apr. 8, 2004

(65) Prior Publication Data

US 2005/0228874 A1    Oct. 13, 2005

(51) Int. Cl.
- *H04L 9/00* (2006.01)
- *G06F 11/30* (2006.01)
- *G06F 7/04* (2006.01)
- *G06F 17/30* (2006.01)

(52) U.S. Cl. .................. 713/168; 713/164; 713/165; 713/166; 713/167; 726/2; 726/3; 726/4; 726/5; 726/6; 726/7; 726/27; 726/28; 726/29; 726/30; 709/223; 709/224; 709/225; 709/226; 709/227

(58) Field of Classification Search .................. 713/168
See application file for complete search history.

(56) References Cited

U.S. PATENT DOCUMENTS

| | | | |
|---|---|---|---|
| 5,202,921 | A | 4/1993 | Herzberg et al. |
| 5,331,574 | A | 7/1994 | Temoshenko et al. |
| 5,412,723 | A | 5/1995 | Canetti et al. |
| 5,446,680 | A | 8/1995 | Sekiya et al. |
| 5,497,421 | A | 3/1996 | Kaufman et al. |
| 5,521,949 | A | 5/1996 | Huang et al. |
| 5,560,008 | A | 9/1996 | Johnson et al. |

(Continued)

FOREIGN PATENT DOCUMENTS

JP      08-314835      11/1996

(Continued)

OTHER PUBLICATIONS

"Search Report and Written Opinion for International Application No. PCT US04 34533", (Jan. 31, 2006), 10 pgs.

(Continued)

*Primary Examiner*—Longbit Chai

(57) ABSTRACT

A system and method is provided to verify configuration of a client access device requesting access to a network by establishing a communications link between a network access system and the client access device to authenticate and authorize the client access device and a user associated with the client access device. The network access system further receives client device configuration data from the client access device over the communications link during an authentication and authorization exchange and processes the client device configuration data to determine if the client access device will be granted access to the network.

34 Claims, 10 Drawing Sheets

U.S. PATENT DOCUMENTS

| | | | |
|---|---|---|---|
| 5,606,663 | A | 2/1997 | Kadooka |
| 5,611,048 | A | 3/1997 | Jacobs et al. |
| 5,638,514 | A | 6/1997 | Yoshida et al. |
| 5,726,883 | A | 3/1998 | Levine et al. |
| 5,781,189 | A | 7/1998 | Holleran et al. |
| 5,793,952 | A | 8/1998 | Limsico |
| 5,799,084 | A | 8/1998 | Gallagher et al. |
| 5,815,665 | A | 9/1998 | Teper et al. |
| 5,832,228 | A | 11/1998 | Holden et al. |
| 5,845,267 | A | 12/1998 | Ronen |
| 5,852,812 | A | 12/1998 | Reeder |
| 5,892,900 | A | 4/1999 | Ginter et al. |
| 5,923,756 | A | 7/1999 | Shambroom |
| 5,953,422 | A | 9/1999 | Angelo et al. |
| 6,023,470 | A | 2/2000 | Lee et al. |
| 6,023,502 | A | 2/2000 | Bouanaka et al. |
| 6,026,375 | A | 2/2000 | Hall et al. |
| 6,028,917 | A | 2/2000 | Creamer et al. |
| 6,029,143 | A | 2/2000 | Mosher et al. |
| 6,032,132 | A | 2/2000 | Nelson |
| 6,032,137 | A | 2/2000 | Ballard |
| 6,035,281 | A | 3/2000 | Crosskey et al. |
| 6,047,051 | A | 4/2000 | Ginzboorg et al. |
| 6,064,736 | A | 5/2000 | Davis et al. |
| 6,094,721 | A | 7/2000 | Eldridge et al. |
| 6,112,239 | A | 8/2000 | Kenner |
| 6,125,354 | A | 9/2000 | MacFarlane et al. |
| 6,128,601 | A | 10/2000 | Van Horne et al. |
| 6,141,756 | A | 10/2000 | Bright et al. |
| 6,157,618 | A | 12/2000 | Boss et al. |
| 6,167,126 | A | 12/2000 | Janning |
| 6,175,869 | B1 | 1/2001 | Ahuja et al. |
| 6,182,229 | B1 | 1/2001 | Nielsen |
| 6,188,994 | B1 | 2/2001 | Egendorf |
| 6,189,096 | B1 | 2/2001 | Haverty |
| 6,198,824 | B1 | 3/2001 | Shambroom |
| 6,208,977 | B1 | 3/2001 | Hernandez et al. |
| 6,212,280 | B1 | 4/2001 | Howard, Jr. et al. |
| 6,216,117 | B1 | 4/2001 | Hall |
| 6,219,790 | B1 | 4/2001 | Lloyd et al. |
| 6,253,327 | B1 | 6/2001 | Zhang et al. |
| 6,260,142 | B1 | 7/2001 | Thakkar et al. |
| 6,269,401 | B1 | 7/2001 | Fletcher et al. |
| 6,307,837 | B1 | 10/2001 | Ichikawa et al. |
| 6,330,443 | B1 | 12/2001 | Kirby |
| 6,401,211 | B1 | 6/2002 | Brezak, Jr. et al. |
| 6,405,028 | B1 | 6/2002 | DePaola et al. |
| 6,446,207 | B1 | 9/2002 | Vanstone et al. |
| 6,510,463 | B1 | 1/2003 | Farhat et al. |
| 6,513,060 | B1 | 1/2003 | Nixon et al. |
| 6,522,884 | B2 | 2/2003 | Tennison et al. |
| 6,539,482 | B1 | 3/2003 | Blanco et al. |
| 6,549,770 | B1 | 4/2003 | Marran |
| 6,578,075 | B1 | 6/2003 | Nieminen et al. |
| 6,628,775 | B1 | 9/2003 | Van Tol |
| 6,640,242 | B1 | 10/2003 | O'Neal et al. |
| 6,687,560 | B2 | 2/2004 | Kiser et al. |
| 6,725,310 | B2 | 4/2004 | Shoobe et al. |
| 6,732,270 | B1 | 5/2004 | Patzer et al. |
| 6,785,823 | B1 | 8/2004 | Abrol et al. |
| 6,839,320 | B2 | 1/2005 | Paridaens et al. |
| 6,851,062 | B2 | 2/2005 | Hartmann et al. |
| 6,925,182 | B1 | 8/2005 | Epstein |
| 6,947,992 | B1 | 9/2005 | Shachor |
| 6,952,768 | B2 | 10/2005 | Wray |
| 7,020,645 | B2 | 3/2006 | Bisbee et al. |
| 7,031,705 | B2 * | 4/2006 | Grootwassink ......... 455/432.1 |
| 7,203,838 | B1 | 4/2007 | Glazer et al. |
| 2001/0021915 | A1 | 9/2001 | Cohen et al. |
| 2001/0034677 | A1 | 10/2001 | Farhat et al. |
| 2001/0034693 | A1 | 10/2001 | Farhat et al. |
| 2001/0034704 | A1 | 10/2001 | Farhat et al. |
| 2001/0044893 | A1 | 11/2001 | Skemer |
| 2001/0044900 | A1 | 11/2001 | Uchida |
| 2002/0029275 | A1 | 3/2002 | Selgas et al. |
| 2002/0083009 | A1 | 6/2002 | Lansing et al. |
| 2002/0114346 | A1 | 8/2002 | Lampe et al. |
| 2002/0144108 | A1 | 10/2002 | Benantar |
| 2003/0079143 | A1 | 4/2003 | Mikel et al. |
| 2003/0131264 | A1 | 7/2003 | Huff et al. |
| 2003/0158960 | A1 | 8/2003 | Engberg |
| 2003/0177389 | A1 * | 9/2003 | Albert et al. ............... 713/201 |
| 2003/0186681 | A1 | 10/2003 | Gabor |
| 2004/0078284 | A1 | 4/2004 | Musgrove et al. |
| 2004/0181602 | A1 | 9/2004 | Fink |
| 2005/0091075 | A1 | 4/2005 | Cohen et al. |

FOREIGN PATENT DOCUMENTS

| | | |
|---|---|---|
| JP | 10-215284 | 8/1998 |
| JP | 11-168459 | 6/1999 |
| JP | 11-284666 | 10/1999 |
| JP | 11-313055 | 11/1999 |
| JP | 2000-101640 | 4/2000 |
| JP | 00151754 | 5/2000 |
| WO | WO-00/35151 A1 | 6/2000 |
| WO | WO-01/03398 A2 | 1/2001 |

OTHER PUBLICATIONS

"U.S. Appl. No. 10/117,868, Response filed Oct. 31, 2007 to Final Office Action mailed Sep. 4, 2007", 22 pgs.

"U.S. Appl. No. 10/117,868 Non-Final Office Action mailed Feb. 21, 2008", OARN,25 pgs.

"U.S. Appl. No. 10/118,406 Non-Final Office Action mailed Apr. 11, 2008", OARN,12 Pgs.

"U.S. Appl. No. 10/118,406, Non-Final Office Action mailed Nov. 19, 2007", OARN,13 pgs.

"U.S. Appl. No. 10/456,736, Non-Final Office Action mailed Apr. 11, 2008", 10 Pgs.

"U.S. Appl. No. 10/456,736,Final Office Action mailed Dec. 10, 2007", FOAR,15 pgs.

"U.S. Appl. No. 10/118,406, Response filed Feb. 22, 2008 to Non-Final Office Action mailed Nov. 19, 2007", 5 pgs.

"U.S. Appl. No. 10/456,736, Response filed Feb. 13, 2008 to Final Office Action mailed Dec. 10, 2007", 14 Pgs.

"International Application Serial No. PCT/US02/12343, International Preliminary Examination Report mailed Jul. 8, 2003", 8 pgs.

"International Application Serial No. PCT/US03/17905, International Preliminary Examination Report mailed Mar. 29, 2006", 4 pgs.

"International Application Serial No. PCT/US03/17905, Response filed Jul. 1, 2005 to Written Opinion mailed May 23, 2005", 12 pgs.

"International Application Serial No. PCT/US03/17905, Written Opinion mailed May 23, 2005", 4 pgs.

"International Application Serial No. PCT/US04/34533, International Preliminary Report on Patentability mailed Nov. 8, 2006", 6 pgs.

"International Application Serial No. PCT/US04/34533, International Search Report mailed Jan. 31, 2006", 4 pgs.

"International Application Serial No. PCT/US04/34533, Written Opinion mailed Jan. 31, 2006", 6 pgs.

"Session Identification URI", *W3C Working Draft WD-session-id-960221*, http://web.archive.org/web/19970730054113/http:/lwww.w3,orglTRIWD-session-id,(Jul. 30, 1997),pp. 1-10.

"U.S. Appl. No. 10/117,868 Final Office Action mailed Jul. 25, 2006", 25 pgs.

"U.S. Appl. No. 10/117,868 Final Office Action Mailed Sep. 4, 2007", 26 pgs.

"U.S. Appl. No. 10/117,868 Non Final Office Action mailed Mar. 14, 2007", 27 pgs.

"U.S. Appl. No. 10/117,868 Non Final Office Action mailed Dec. 9, 2005", 46 pgs.

"U.S. Appl. No. 10/117,868 Response filed Mar. 1, 2006 to Non Final Office Action mailed Dec. 9, 2005", 17 pgs.

"U.S. Appl. No. 10/117,868 Response filed Jun. 13, 2007 to Non Final Office Action mailed Mar. 14, 2007", 20 pgs.

"U.S. Appl. No. 10/117,868 Response filed Dec. 20, 2006 to Final Office Action mailed Jul. 25, 2006", 17 pgs.

"U.S. Appl. No. 10/118,380 Non Final Office Action mailed Dec. 14, 2005", 31 pgs.

"U.S. Appl. No. 10/118,380 Response filed Mar. 13, 2006 to Non Final Office Action mailed Dec. 14, 2005", 18 pgs.

"U.S. Appl. No. 10/118,406 Final Office Action mailed Jul. 24, 2007", 13 pgs.

"U.S. Appl. No. 10/118,406 Final Office Action mailed Aug. 16, 2006", 12 pgs.

"U.S. Appl. No. 10/118,406 Non Final Office Action mailed Feb. 28, 2006", 31 pgs.

"U.S. Appl. No. 10/118,406 Non Final Office Action mailed Mar. 8, 2007", 11 pgs.

"U.S. Appl. No. 10/118,406 Response filed Jun. 5, 2006 to Non Final Office Action mailed Feb. 28, 2006", 13 pgs.

"U.S. Appl. No. 10/118,406 Response filed Jun. 15, 2007 to Non Final Office Action mailed Mar. 8, 2007", 7 pgs.

"U.S. Appl. No. 10/118,406 Response filed Dec. 8, 2006 to Final Office Action mailed Aug. 16, 2006", 13 pgs.

"U.S. Appl. No. 10/456,736 Non Final Office Action mailed Jul. 10, 2007", 23 pgs.

"U.S. Appl. No. 10/118,406, Response filed to Final Office Action mailed Jul. 24, 2007", 15 pgs.

"Japanese Patent Application No. 2002-584172, Notice of the Reason For Refusal mailed Jul. 10, 2007", (with English Translation), 24 pgs.

"U.S. Appl. No. 10/117,868, Non-Final Office Action mailed Sep. 17, 2008", OARN, 23 pgs.

"U.S. Appl. No. 10/118,406, Final Office Action mailed Aug. 28, 2008", 10 pgs.

"U.S. Appl. No. 10/456,736, Preliminary Amendment mailed Jul. 6, 2005", 9 pgs.

"U.S. Appl. No. 10/456,736 Response filed Sep. 18, 2008 to Final Office Action mailed Jun. 19, 2008", 19 pgs.

"Japanese Application Serial No., Office Action mailed Feb. 13, 2007", 4 pgs.

"U.S. Appl. No. 10/117,868 response filed 11-26o Non-Final Office Action mailed Sep. 17", 16 pgs.

"U.S. Appl. No. 10/118,380, Notice of Allowance Received", NOAR, 15 pgs.

"U.S. Appl. No. 10/456,736, Examiner Interview Summary mailed Feb. 4, 2008", 3 pgs.

"U.S. Appl. No. 10/456,736, Examiner Interview Summary mailed Aug. 21, 2008", 4 pgs.

"U.S. Appl. No. 10/456,736, Non-Final Office Action mailed Nov. 13, 2008", 12 pgs.

"U.S. Appl. No. 10/456,736, Response filed Dec. 10, 2008 to Non-Final Office Action mailed Nov. 13, 2008", 13 pgs.

* cited by examiner

METHOD AND SYSTEM FOR VERIFYING AND UPDATING THE CONFIGURATION OF AN ACCESS DEVICE DURING AUTHENTICATION

FIELD OF THE INVENTION

The present invention relates generally to authorizing connectivity to networks. More particularly, the present invention relates to a method and system for verifying the configuration of an access device during an authentication and authorization exchange, e.g., a client device requesting access to a computer network when the entity authorizing access does not have direct control over the entity providing network access.

BACKGROUND

Due to the increasing globalization of economies, the need to provide network communications between geographically dispersed persons and facilities has increased. As a result, enterprises desire to protect their network while also providing network access to its locally and remotely situated persons and/or facilities. Protecting the network includes protecting a user's network access device and information thereon, and protecting the network to which the user's access device is connected. For example, a host network and connected clients may be vulnerable to rogue code, such as a virus, running on one of the client access devices.

In a private network, where the same entity is authenticating the user and controlling network access, there are solutions that will inspect the configuration of the device during authentication, and then either deny access or quarantine the device (by restricting it to a special VLAN) until the configuration has been updated, and the device is no longer a threat to the network. The configuration update takes place after the authentication has been completed.

When roaming on a $3^{rd}$ party network (e.g., a public network), the $3^{rd}$ party network will not have a VLAN dedicated to remediation for that customer's configurations. Therefore, there is no easy way to remediate the device after authentication. Once authentication is complete, the device is granted full network access and the device and/or the network are thus vulnerable.

SUMMARY OF THE INVENTION

A method and system is provided to verify and if necessary, update configuration of a client access device during an authentication and authorization exchange. In accordance with an embodiment of the invention, the method includes establishing a communications link with the client access device to authenticate and authorize a user associated with the client access device and receiving client device configuration data from the client access device over the communications link during an authentication and authorization exchange, processing the client device configuration data, and selectively granting the client access device access to the network based upon the client device configuration data.

In one embodiment, processing the client device configuration data includes determining if it meets predetermined security requirements by comparing the client device configuration data with reference configuration data.

In various embodiments, if the client device configuration data fails to meet the predetermined security requirements, the method includes updating the client device configuration data and granting the client access device access to the network. If the client device configuration data cannot be updated, the client access device may be denied access to the network.

According to one embodiment, the establishing of the communications link with the client access device may include, communicating an agent to the client access device, wherein the agent is operable to identify the client device configuration data and to communicate the client device configuration data to a server of the network. If after the processing of the client device configuration data, the client device configuration data requires an update, the agent may be used to update the client access device with updated configuration data. After which, an update result indicator may be sent from the agent to confirm that the configuration of the client access device has been updated.

In another embodiment, the establishing of the communications link with the client access device may include communicating a command set, which may further include at least one command, to the client access device, wherein the command set is operable to identify the client device configuration data and to communicate the client device configuration data to a server of the network. If after the processing of the client device configuration data, the client device configuration data requires an update, the command set may be used to update the client access device with updated configuration data. The command set may further include a first command set to identify and communicate the client device configuration data to the server, and a second command set to update the client access device with the updated configuration data. After which, an update result indicator may be sent from the client access device to confirm that the configuration of the client access device has been updated.

In one embodiment, after establishing communications with the client access device, authenticating a user associated with the client access device, which may include verifying user login information associated with the user attempting access to the network.

Among varying embodiments, the client device configuration data may include at least one of virus definition data, firewall configuration data, and operating system configuration data.

In accordance with an embodiment of the invention, the system to verify configuration data of a client access device requesting access to a network may include a network access server, coupled to a network, to establish a communications link to the client access device to authenticate and authorize a user associated with the client access device and to receive the client device configuration data from the client access device over the communications link during an authentication and authorization exchange, and at least one further server coupled to the network access server to process received configuration data and to selectively grant the client access device access to the network based upon the received client device configuration data.

According to one embodiment, the at least one further server may include a configuration server to process the client device configuration data such that it determines if the client device configuration data meets predetermined security requirements, wherein the configuration server may compare the client device configuration data with reference configuration data to determine if the client device configuration data meets predetermined security requirements. If the predetermined security requirements are not met, the configuration server may update the client device configuration data or deny network access to the client access device if the client device configuration data is not updated.

In one embodiment, to establish the communications link with the client access device, the network access server may communicate an agent to the client access device, wherein the agent is operable to identify the client device configuration data and to communicate the client device configuration data to at least one of the network access server and the configuration server. If the client device configuration data requires an update, the configuration server may use the agent to update client device configuration data with updated configuration data. After the agent updates the client access device, the configuration server may receive an update result indicator from the agent to confirm that the configuration of the client device has been updated.

According to another embodiment, to establish the communications link with the client access device, the network access server may communicate a command set to the client access device, the command set is operable to identify the client device configuration data and to communicate the client device configuration data to at least one of the network access server and the configuration server. If after the processing of the client device configuration data, the client device configuration data requires an update, the configuration server is operable to further use the command set to update client device configuration data with updated configuration data. After the configuration server updates the client access device, the configuration server may receive an update result indicator from the client access device to confirm that the client configuration has been updated. The command set may further include a first command set to identify and communicate the client device configuration data to the server, and a second command set to update the client access device with the updated configuration data.

In one embodiment, the at least one further server may include an authentication server to authenticate and authorize a user associated with the client access device.

In another embodiment, the client device configuration data may include at least one of virus definition data, firewall configuration data, and operating system configuration data.

Embodiments of the invention also extend to machine-readable mediums embodying a sequence of instructions for carrying out any of the methods described herein.

Other features and advantages of the present invention will be apparent from the drawings and detailed description that follow.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
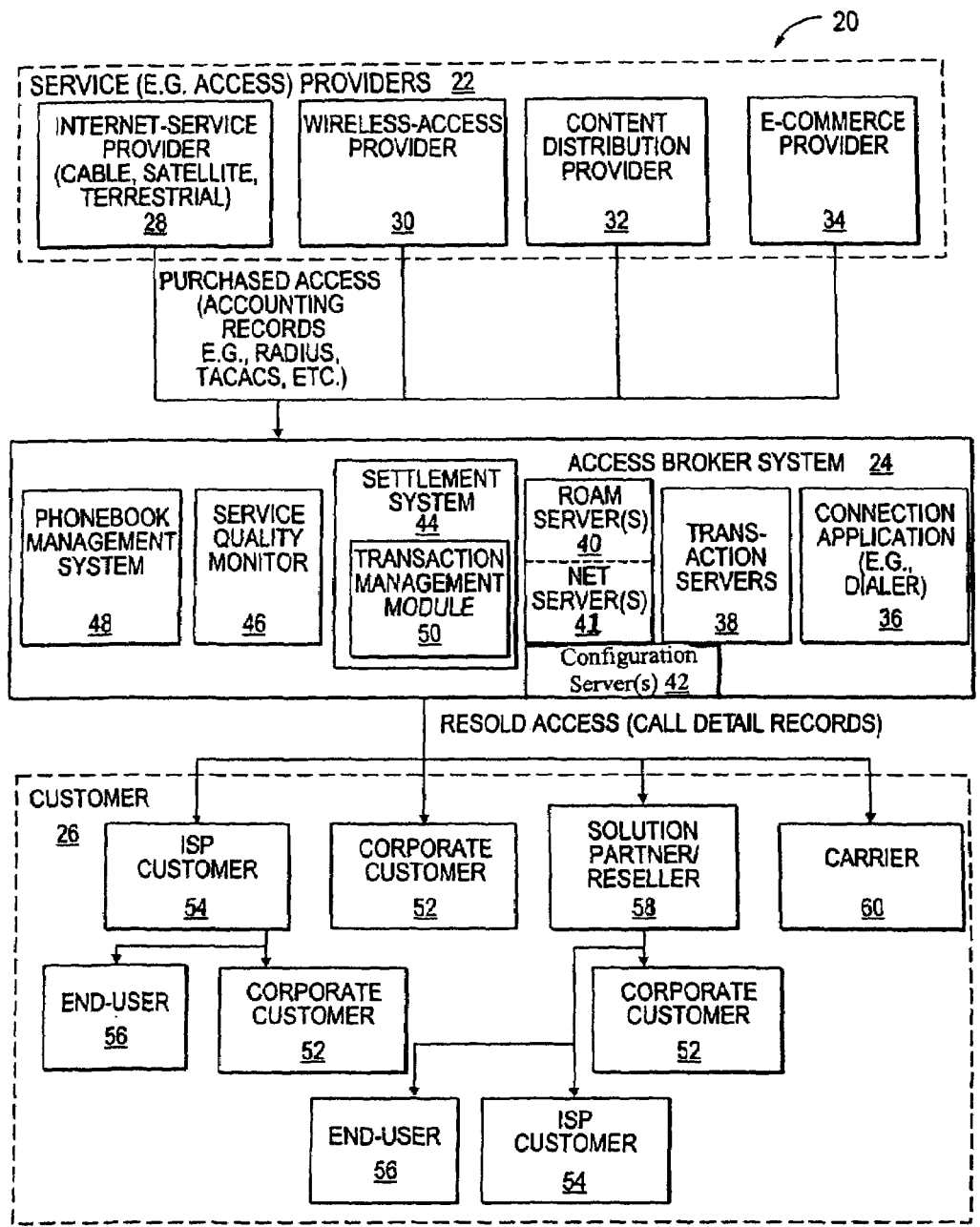
FIG. 1 is a schematic block diagram of a multi-party service access environment, in accordance with an exemplary embodiment of the invention, which includes multiple service providers, an access broker system, and multiple customers.

A method and system to verify and optionally update configuration of a client access device during an authentication and authorization exchange is described. In one embodiment, the method includes dynamically setting the configuration (e.g., configuration and data files) of a client access device during an authentication and authorization exchange to configure the device prior to allowing it access to a network, such as the Internet. The authentication and authorization exchange may also include verifying identity credentials received from the client, which in the simple case may be a user name and password of a user associated with the client access device. For example, a client access device may only obtain an IP (Internet Protocol) address if the user associated with the client access is authenticated and the client access device configuration is found to be in an acceptable state, or is updated to an acceptable state during the authentication and authorization exchange. Accordingly, in one embodiment, the device may be deemed protected, regardless of its state (e.g., configuration) prior to attempting to connect.

An exemplary application of the invention is in a multi-party service access environment and its application therein is described below by way of example. Such an application may include roaming users, multiple service providers and multiple customers. For example, in such an environment, a roaming user located in a geographical location remote from his/her "home" service provider can establish a network connection to a local service provider via a network access device (e.g., to obtain Internet access). Accordingly, a long distance call by the user from the remote geographical location to the "home" service provider may be avoided which may have significant cost advantages. Further, certain network services (e.g., DSL lines) may not be available via such a long distance call and making a local connection to a local service provider may provide numerous advantages (e.g., enhanced bandwidth).

Whether the user is local or remote to the "home" service provider, the user's network access device configuration may be confirmed by the home service provider prior to authorizing network access. For example, if the home service provider determines the client network access device configuration is using outdated anti-virus pattern files, the home service provider may update the AV files before telling the network service provider to authorize network access. This example may extend to any client network access device's software, or firmware, component that may be determined as a threat to network stability.

For the purposes of the present specification, the term "service access transaction" includes any transaction between a service customer and a network service provider for a user session. An example of such a service may be access to any communications network via any medium or protocol. For example, the communications networks may comprise packet-switched networks, circuit-switched networks, cable networks, satellite networks, terrestrial networks, wired networks, or wireless networks. The term "service access transaction", however, is not limited to a network access transaction, and may encompass a transaction pertaining to access to any one of a number of other services such as content, commerce and communications services.

For the purposes of this specification, the term "customer" or "parties" includes any entity involved in the purchase and/or consumption of service access, regardless of whether the service access is performed by the customer or not. Additionally, "customer" also includes any user associated with a network access device utilized for attempting network access. For example, a "customer" may be an end-user consumer using a network access device that actually utilizes the service access, or a corporate entity to which such an end-user belongs, an Internet service provider, an Internet carrier, a reseller, or a channel.

For the purposes of this specification, the term "protected network access device" includes any device, which meets predefined security criteria. For example, the security criteria may include, but are not limited to, an acceptable version of an anti-virus application, a firewall application, virus definition files, firewall configuration files, operating system (OS) patches, profile settings on the device relating to the aforementioned settings, or the like. Thus, the various settings (e.g., security settings in a Windows OS) on the network access device as well as the security related applications provided on the client device might be referred to as the configuration of the network access device.

The exemplary embodiment of the present invention discloses a transaction management system and method to manage service access services (e.g., Internet access, content access, commerce access, or communications access) via a plurality of service providers (e.g., an ISP, a wireless service provider, a virtual private network (VPN) service provider, a content distribution service provider, an e-commerce service provider or an application service provider).

Multi-Party Service Access Environment

Referring to the drawings, reference numeral 20 generally indicates an exemplary multi-party service access environment, in the exemplary form of a network access environment. The network access environment 20 includes a plurality of service access providers 22, an access broker system 24, in accordance with the invention, and multiple customers (or consumers) 26. At a high level, the service access providers 22 have service (e.g., access, content, e-commerce services etc.) capacity that is sold, via the access broker system 24, to the multiple customers 26. Accordingly, the access broker system 24 may be regarded as aggregating or purchasing service capacity (e.g., service access), which is then resold to the customers 26. In the exemplary embodiment, the service access providers 22 may include any communication network service providers, such as ISPs 28 (e.g., UUNet Technologies, Genuity, CompuServe Network Services, EQUANT, Hong Kong Telecom, etc.), wireless access providers 30 (e.g., Verizon™, Sprint™, Pacific Bell™, Tmobile™, etc.), content distribution providers 32 and e-commerce providers 34. It will however be appreciated that the service access providers 22 may include any number or type of service providers providing any number of services (e.g., access, content, communications or e-commerce services, to name but a few).

The exemplary access broker system 24 is shown to include a number of exemplary functional modules that may be located at different physical locations. It will be appreciated that various embodiments of the inventions may not include all the modules shown by way of example or may include other modules.

The access broker system may include a connection application (a client application) in the form of a dial-up application or connect dialer 36, installed on a service or network access device (e.g., a computer system) of a customer 26 that facilitates convenient access to a communications network of any one of the service access providers 22. In one embodiment, the connect dialer 36 may provide a simple point-and-click interface for dialing into a worldwide connection network of the access broker system 24.

The access broker system 24 may also include a plurality of transaction servers 38, roam servers 40, net servers 41, configuration servers 42, a settlement system 44, a service quality monitor system 46, and a phonebook management system 48. The transaction servers 38 may provide trusted third-party functionality of routing and logging user identification information, authorization responses and usage, and accounting information.

Whereas the connect dialer 36 may be installed on a client or user network access device, the net servers 41 may be installed at a "remote" ISP allowing its POPs to be utilized by roaming users, and roam servers 40 and configuration servers 42 may reside at a "home" ISP to allow a roaming user to access an associated home network provided that the configuration of the client network access device meets certain security criteria. It should be noted that the transaction servers 38 might operate to route messages between the network servers 42 and the roam servers 40. It should also be noted that the configuration servers 42 might also be hosted at the transaction servers 38.

The settlement system 44, including a transaction management module 50, performs financial settlement of service access transactions between the service access providers 22 and the customers 26. The Service Quality Monitor (SQM) system 46 may facilitate the collection and analysis of quality of service (QoS) information for services provided to customers 26 and a Phonebook Management System 48 may facilitate management of multiple connect dialers 36 used by customers 26. The transaction servers 38 may be accessed by the settlement system 44 to load transaction data (see FIG. 2). The various components in the multi-party service access environment 20 may include aspects of known functionality and, dependent upon the specific embodiment of the invention, certain components may be omitted and other components may be added.

The Customers

The customers 26, in the embodiment depicted in the drawings, are arranged in an exemplary multi-tier customer structure, whereby the access broker system 24 may interact with customers 26 that operate according to a variety of business plans and needs. At one end of the spectrum, the customer 26 may comprise an individual end-user that subscribes to roaming network access facilitated via the access broker system 24. Alternatively, the customer 26 may be in the form of a corporate customer 52 (e.g., a corporation or business) that purchases roaming network (e.g., Internet) access for employees of the corporation.

Each customer 26 may also comprise an ISP customer 54 that purchases roaming Internet access for resale to its customers (e.g., end-users 56 and/or corporate customers 52). Each customer 26 may also operate as a solution partner or reseller 58 that markets and resells roaming Internet access brokered by the access broker system 24 to end-users 56, corporate customers 52 and/or ISP customers 54.

The customers 26 may also include parties regarded as Internet Carriers 60 (e.g., IXCs, RBOs, CLECs, ILECs and ISPs). It will thus be appreciated that in the multi-party access environment 20 a number of different service providers may participate in providing access to a roaming user and, accordingly, the security risk posed by any network access device may be of importance. For example, when a network access device connects to the network, the device may be vulnerable to an attack from other systems on the network (e.g., accessing assets on the device, running Trojan applications on the device, installing viruses, worms, or the like).

Roaming Service Access

Figure 2:
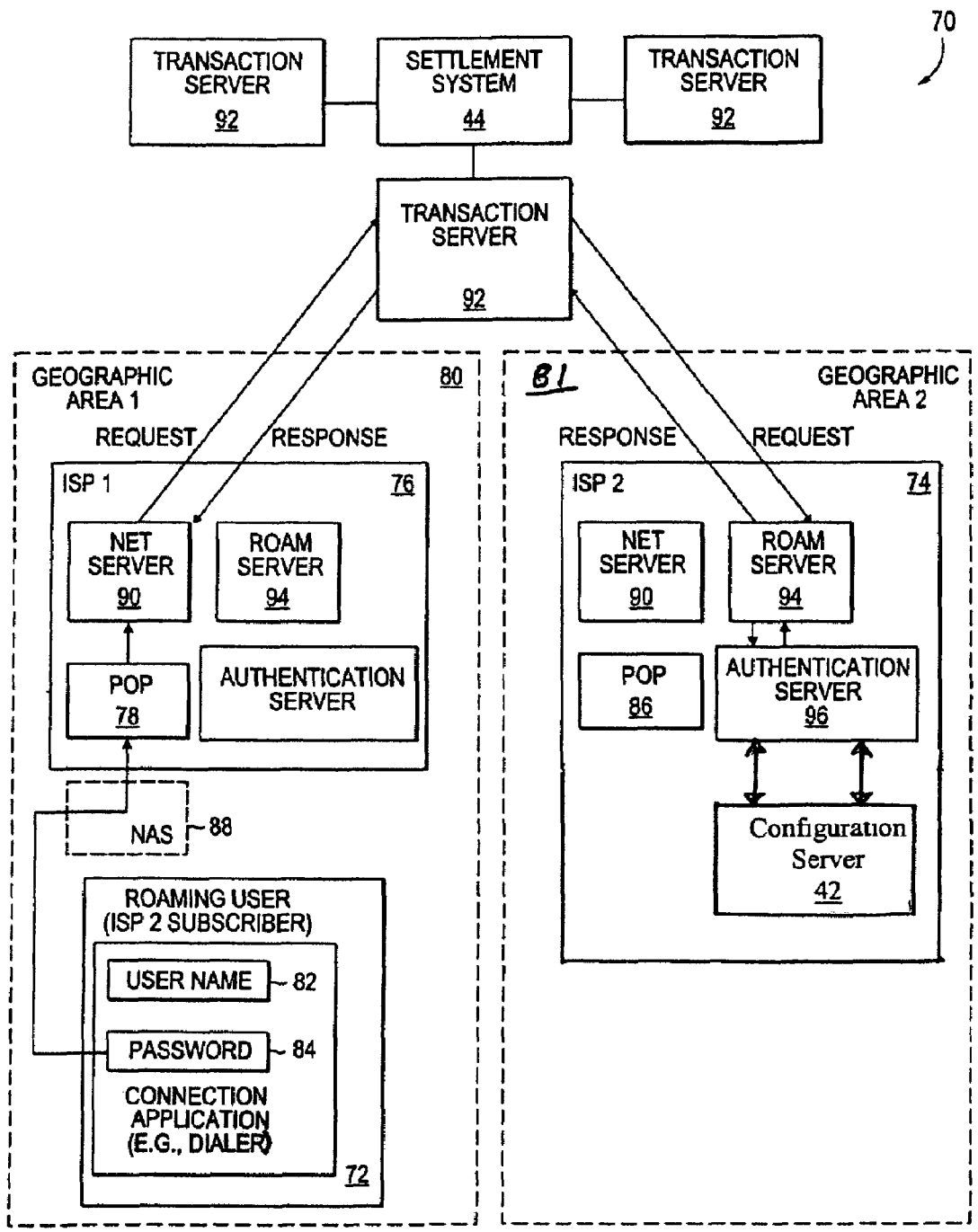
FIG. 2 is a schematic diagram illustrating operation of an access broker system, in accordance with an exemplary embodiment of the invention, that provides roaming Internet access.

Referring in particular to FIG. 2, reference numeral 70 generally indicates exemplary operation of the access broker system 24 in providing roaming Internet access in a relatively secure manner to a plurality of customers via any one of the plurality of service access providers 22. When a roaming user 72, shown to be a subscriber to a "home" ISP 74, connects via a client access device to a remote ISP 76 that provides a local POP 78 within a specific geographic area 80, the roaming user 72 may input the same user name 82 and password 84 (authentication data or user credentials) used when connecting via a POP 86 of the "home" ISP 74. In the exemplary embodiment depicted in FIG. 2, the roaming user 72 may connect to the POP 78 via a network access server (NAS) 88. A net server 90 of the ISP 76 may then establish a connection with a transaction server 92 (see also the transaction servers 38 in FIG. 1). The transaction server 92 may then communicate with a roam server 94 of the "home" ISP 74. The "home" ISP 74 may then authenticate the roaming user 72 via an authentication server 96, authenticate the configuration network access device via a configuration server 42, and communicate its authentication response to the transaction server 92. The transaction server 92 may then communicate with the net server 90 thereby to permit or deny access to the roaming user. In one exemplary embodiment, the roaming user 72 may, for example, be authenticated using PAP for dialup authentication and 802.1x authentication for wired and wireless broadband authentication. It will however be appreciated that any authentication protocol may be used.

In order to facilitate explanation of roaming service access, FIG. 2 shows only two service access providers 22 namely, the exemplary ISPs 74 and 76. However, it will be appreciated that the access broker system 24 may aggregate or have arrangements with a multitude of different service access providers 22 to facilitate global connectivity for the roaming user 72 (or multitude of customers 26 in FIG. 1). The transaction management module 50, in accordance with the invention, allows the network access broker system 24 to manage transaction data in a multi-party roaming service access environment.

It should also be appreciated that that in other embodiments, the second geographic area 81 and second ISP 74 may be the same as the first geographic area 80 and the first ISP 76, respectively. Therefore, regardless of location, remote or local, an ISP, such as ISP 74, may authenticate the roaming user 72 via an authentication server 96, authenticate the network access device configuration via a configuration server 42, and selectively allow the user and associated network access device access to the network.

Network Access System

Figure 3:
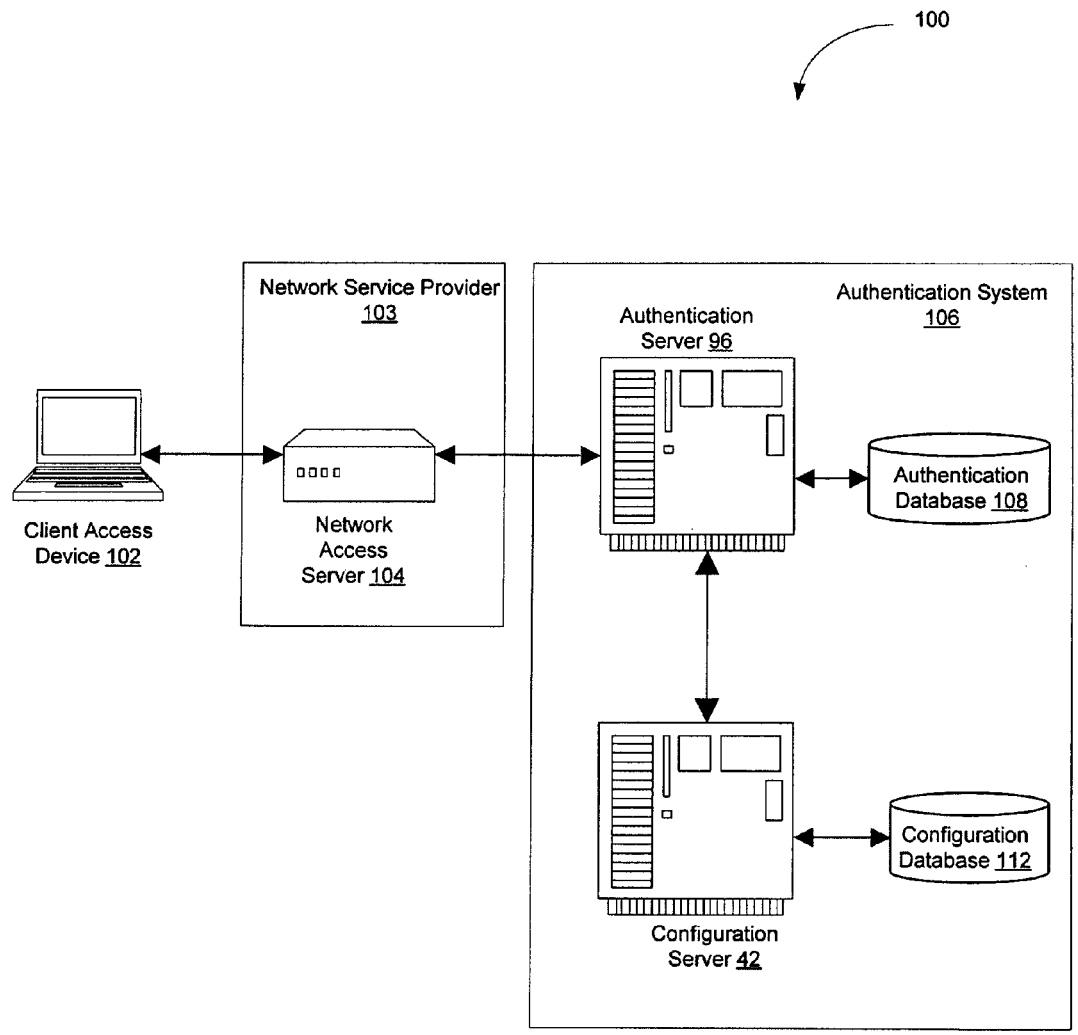
FIG. 3 is a schematic diagram of a network access system, according to an exemplary embodiment of the invention, for a client access device to request network access from a network access server in a multi-party service access environment.

FIG. 3 illustrates a network access system 100 for providing a client access device 102 connectivity to a network, according to an exemplary embodiment of the present invention. The network service provider 103, via the network access server, may provide a secure communication channel between the client access device 102 and the home service provider's authentication system 106 during the authentication process. The client access device 102 may be of any known in the art capable of accessing a network, such as a personal computer, a personal digital assistant (PDA) or a mobile phone. The client access device 102 may thus establish a wireless (e.g., a WiFi) or wired connection.

The network access server 104 may be a point of access to the Internet used by ISPs and providers of Internet regional and local subnets. In one embodiment of the present invention, prior to connecting the client access device 102 to the Internet and during the authentication process, the network access server 104 utilizes the authentication server 96 and a configuration server 42 to authenticate the user of the client access device 102 and/or verify the client access device configuration. The authentication may be done by using a protocol, such as EAP (extensible authentication protocol) to establishment a Tunnel Transport Layer Security (TTLS) tunnel between the client access device 102 and the authentication system 106. The details of an exemplary embodiment utilizing EAP will be discussed further below.

The authentication database 108 may be coupled to the authentication server 96. The authentication database 108 may contain information, such as user names associated passwords, or the like. The configuration database 112 may be coupled to the configuration server 42. The configuration database 112 may contain information, such as the most current anti-virus definition files, firewall configuration files, operating system patch files, and any other security related configuration data.

In one embodiment, the operations of the configuration server 42 and configuration database 112 may be incorporated within the authentication server 96 and authentication database 108. In another embodiment, the authentication database 108 and the configuration database 112 may be implemented as a relational database, and may include a number of tables having entries, or records, that are linked by indices and keys. In an alternative embodiment, the authentication database 108 and the configuration database 112 may be implemented as a collection of objects in an object oriented database.

Figure 4:
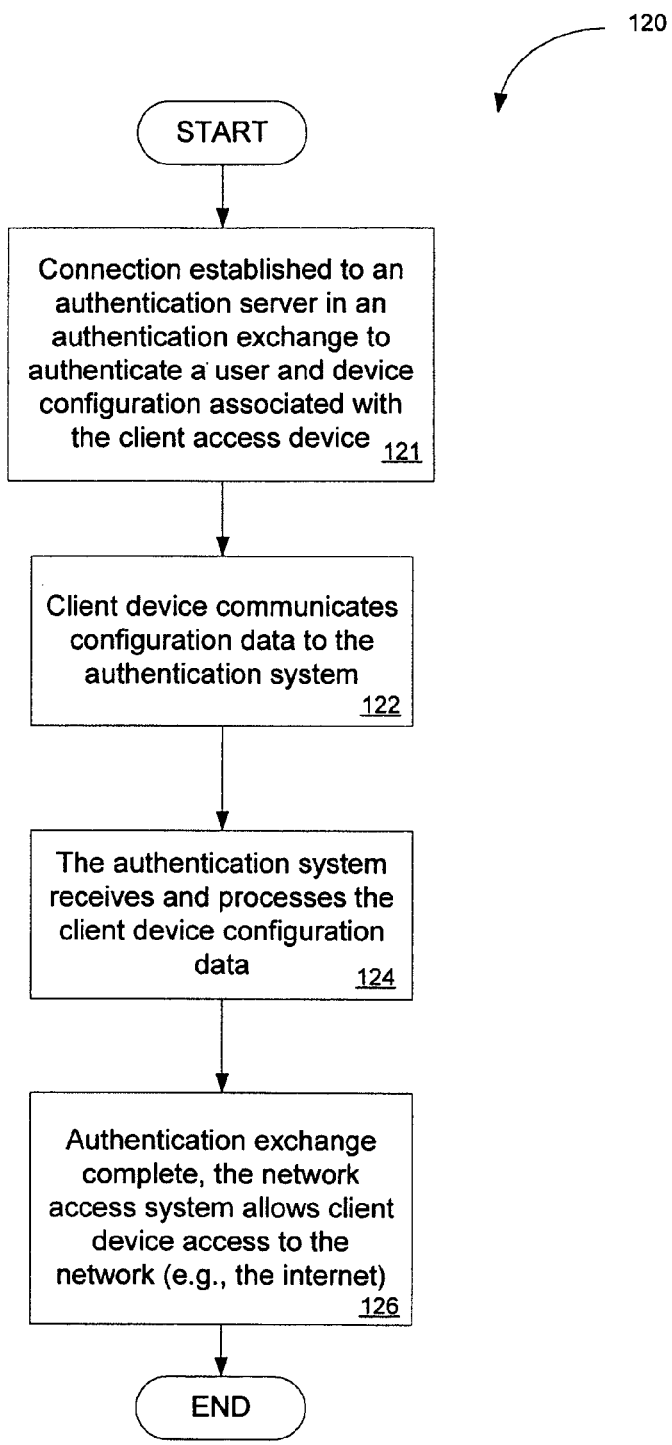
FIG. 4 is a flowchart illustrating a method, according to an exemplary embodiment of the invention, wherein the authentication system selectively allows the client access device access to the network based upon the configuration of the client access device.

FIG. 4 is a flowchart illustrating a method 120, according to an exemplary embodiment of the present invention, wherein the network access system 100 allows or denies the client access device 102 access to the network based upon authentication of the user and the client access device configuration as determined during the authentication process. In one embodiment, a user may activate a connection application (e.g., the dialer 36 in FIG. 1) in order to initiate a network connection and an authentication and authorization exchange. For example, a user associated with the client access device 102 may initiate an authentication and authorization exchange with the authentication server 96 in order to authenticate the user and client access device configuration for network access (see operation 121). Thereafter, at operation 122, the client access device 102 may communicate its configuration data to the authentication system 106 via the network access server 104. Thereafter, the authentication system 106, at operation 124, may receive and process the client access device configuration data. At operation 126, based upon the results of the processed client access device configuration data that reveals or indicates the configuration (e.g., security settings and/or applications) of the client access device 102, the authentication system 106 concludes the authentication and authorization exchange by either granting or denying the client access device 102 access to the network. It will be appreciated that even if the configuration of the client access device 102 is acceptable, the authentication system 106 may still deny the client access device 102 network access. For example, the user associated with the client access device 102 may be denied access for disciplinary or for other policy reasons.

Figure 5:
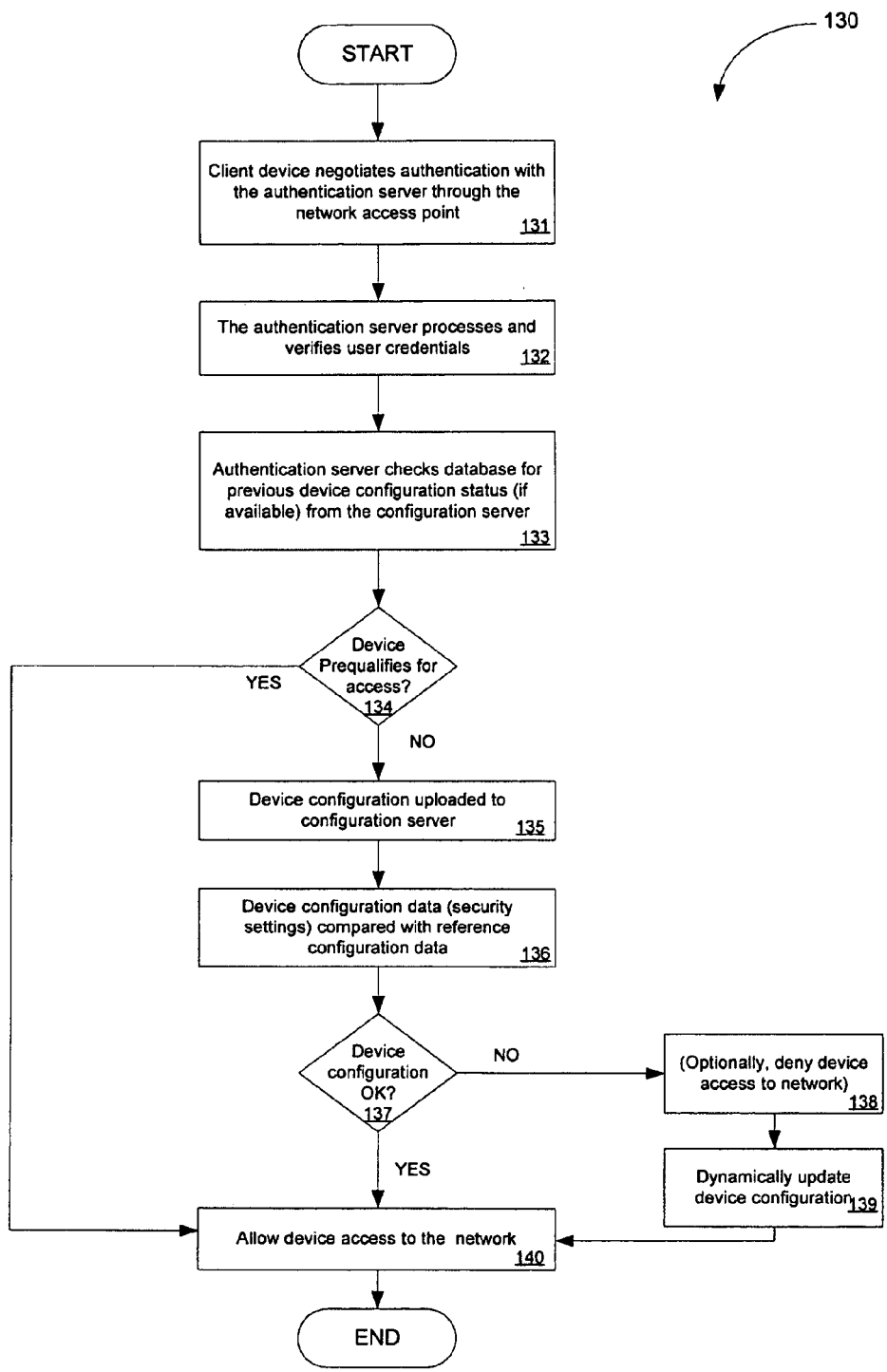
FIG. 5 is a flowchart illustrating a method, according to an exemplary embodiment of the invention, wherein a client access device attempts to access the network.

FIG. 5 is a flowchart of a method 130, according to an exemplary embodiment of the present invention, illustrating the process of a client access device 102 attempting to access the network. At operation 131, the client access device 102 attempts to log in via an authentication and authorization exchange with the authentication server 96 through the network access server 104. At operation 132, the authentication server 96 processes and verifies user credentials associated with the client access device 102. After user authentication, but still during the authentication and authorization exchange, the authentication server 96 requests the last known status of the client access device configuration from the configuration server 42 (see operation 133). For example, the status may indicate the client access device 102 has a current configuration based upon a previous login to the network. If the device pre-qualifies for network access at operation 134, the device is allowed access to the network at operation 140. If the device fails pre-qualification at operation 134, the client access device configuration data is uploaded at operation 135 to the configuration server 42. In another embodiment, operations 133 and 134 are omitted and the device configuration data is uploaded following the user authentication of operation 132.

Once the device configuration data (e.g., security settings, anti-virus software status, firewall status or any other security criteria that pertains to the device) has been received (extracted) from the device, it may then be compared to reference configuration data (see operation 136). For example, the configuration database 112 may include reference configuration data that is associated with a particular user and/or device. When the particular user and/or device requests access to the network, the reference configuration data may be compared to the current configuration of the device. At operation 137, if the device configuration is in an acceptable state, access to the network may be permitted. However, if the device configuration is not in an acceptable state, the configuration server 42 may initiate a dynamic update (download) of the device configuration for the client access device 102 (see operations 138 and 139). Accordingly, the security configuration or settings on the device 102 may then be replaced with a new security configuration or settings. In another embodiment, an override may exist that allows a client device with non-compliant configuration data to access the network. Based upon the results of the authentication and authorization exchange and specifically, the user and the device authentication, at operation 140, the client access device 102 may be granted network access.

It will be appreciated that updating or re-configuring the security settings on the device 102 may, for example, be by agent or server-based.

Agent-Based Update

Figure 6:
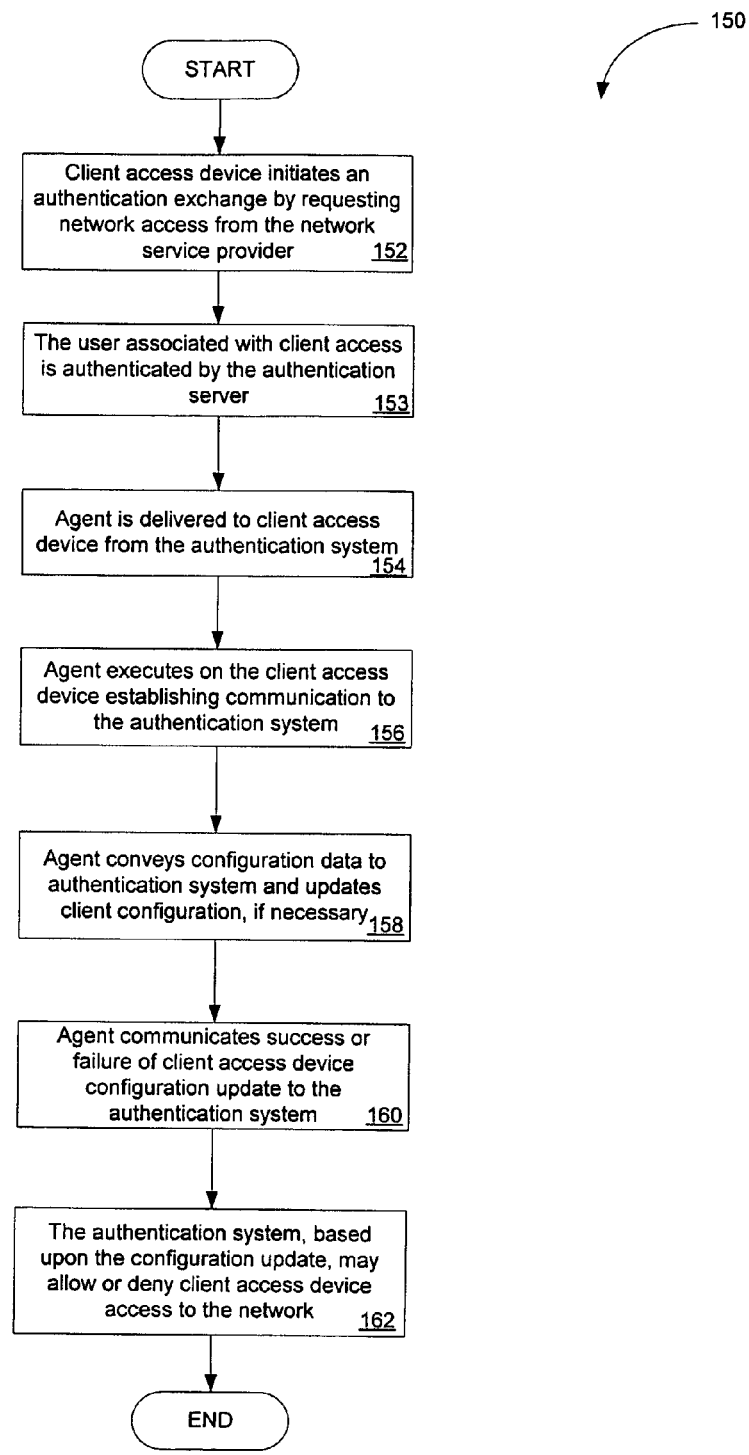
FIG. 6 is a flowchart illustrating a method, according to an exemplary embodiment of the invention, wherein the network access system utilizes an agent to communicate configuration and update data between the authentication system and the client access device.

FIG. 6 is a flowchart that illustrates a method 150, according to an exemplary embodiment of the invention, wherein the authentication system 106 utilizes an agent to communicate configuration and update data between the authentication system 106 and the client access device 102. At operation 152, the client access device 102 requests network access from network service provider 103 by initiating an authentication and authorization exchange with the authentication server 96 via the network access server 104, and at operation 153, the authentication server 96 authenticates the user associated with the client access device 102. The authentication system 106 during the authentication and authorization exchange may for example, via the configuration server 42, the authentication server 96, and the network access server 104, deliver an agent to the client access device 102 (see operation 154). In another embodiment, the agent may already be resident on the client access device 102 prior to the request for network access. For example, the agent may be incorporated with the dialer 36 or may have been previously installed as a standalone application.

The agent executes on the client access device 102 (see operation 156) to establish communication to the authentication system 106. At operation 158, the agent may convey the configuration data of client access device 102 to the authentication system 106 and as described above, if necessary, the client configuration of client access device 102 may be updated. In varying embodiments, the agent, after executing on the client access device 102, may download the update configuration data from the authentication system 106 or the update configuration data may have been included in the agent download (see operation 154). At operation 160, the agent may then communicate an update result indicator to the authentication system 106 indicating the success or failure of the client access device configuration update. It will be appreciated, that the agent might also communicate an equivalent of a "success" to the authentication system 106 if the network access device 102 is in an acceptable state of configuration and does not require a configuration update. Once the device configuration of the client access device 102 has been updated or otherwise found acceptable the client access device 102 may be deemed a protected device. At operation 162, the authentication system 106, based upon the success or failure of the configuration update, may allow or deny the client access device 102 access to the network as described above with reference to FIG. 4. In one embodiment, once the client access device 102 is found to be in an acceptable state, the agent may stay resident on the client access device 102 for the next network access attempt, wherein operations 156 through 162 would be repeated. It should be noted that although the agent may stay resident, the agent might be updated with a more current agent from the authentication system 106 at operation 154. In another embodiment, the agent may remove itself from the client access device 102 once the update is complete and a new agent delivered each time the client access device 102 requests network access.

Command-Based Update

Figure 7:
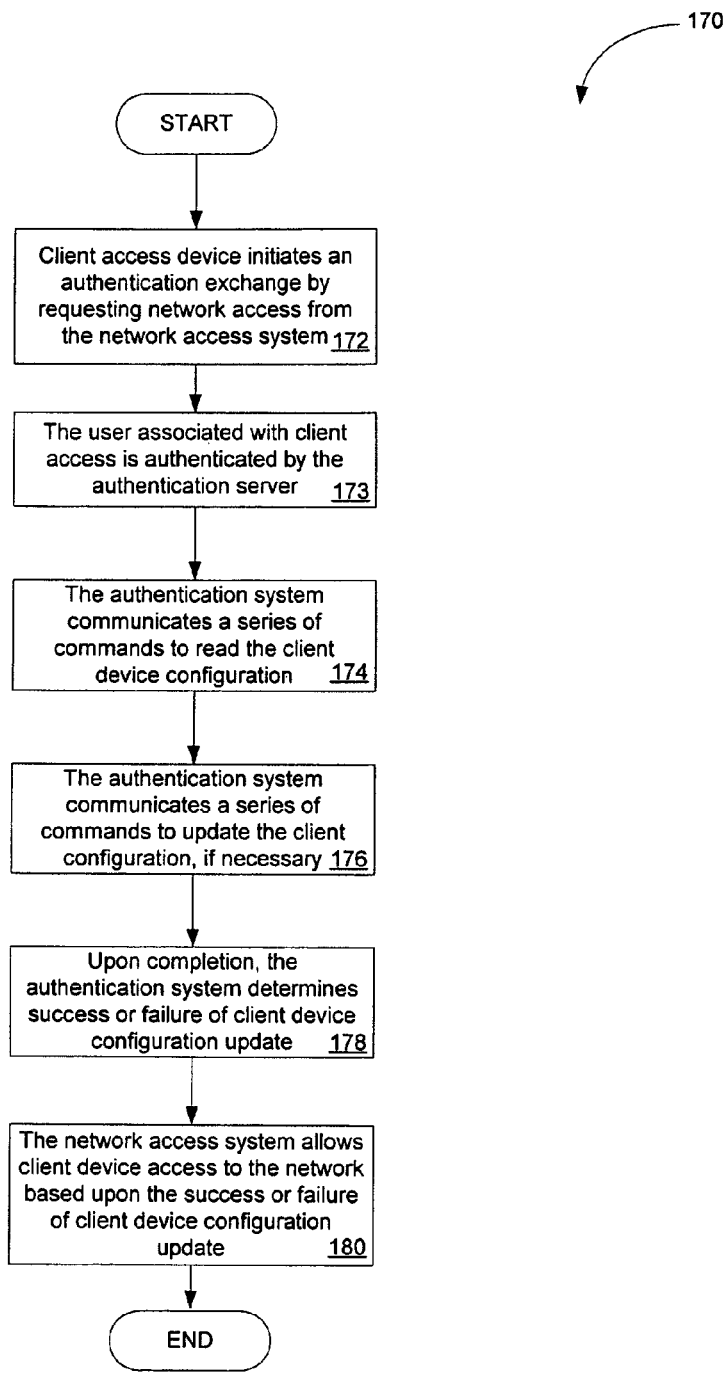
FIG. 7 is a flowchart illustrating a method, according to an exemplary embodiment of the invention, for updating the configuration of client access device via a series of commands from the authentication system.

FIG. 7 is a flowchart of method 170, according to one embodiment of the present invention, for updating the configuration of client access device 102 via a command set from the authentication system 106. Among varying embodiments, multiple command sets may be sent to the client access device 102. These command sets may be communicated to the client access device 102 one at a time or in a group or groups from authentication system 106.

At operation 172, the client access device 102 initiates an authentication and authorization exchange by requesting network access from the network service provider 103 via the network access server 104, and at operation 173, the authentication server 96 authenticates the user associated with the client access device 102. In response, at operation 174, the authentication system 106 communicates a command set to read the configuration of the client access device 102. As described above, the client access device 102 may already be in an acceptable state and an update may be unnecessary. However, if the client access device configuration requires an update, at operation 176, the authentication system 106 communicates another command set to update the client configuration. Finally, at operation 178, the configuration server 42 sends a command to the client access device 102 that requests an indication of whether the update was a success or failure (status of the update operation). If the network access device 102 fails to update its configuration, the device 102 and its associated user are notified of the failure and access to the network may be denied.

Once the client access device 102 is found to be in an acceptable security state the client access device 102 may then be regarded as a protected device. At operation 180, authentication system 106, based upon the success or failure of the configuration update, may allow or deny the client access device 102 access to the network. However, as discussed above with reference to FIG. 4, the client access device 102 and an associated user may still be denied network access despite a successful client access device configuration update.

In one embodiment of the present invention, the command set communicated by the configuration server 42 may be extensible markup language (XML) messages. The XML messages may include, but are not limited to, the following:

ReadRegistry—reads the specified registry key and returns the result

SetRegistry—updates the registry key with the specified contents

DisableComponent—turns off the specified component (e.g., a card)

EnableComponent—turns on a specified component (e.g., a card)

GetOSInfo—returns OS version, list of installed patches

ApplyPatch—installs an OS-level patch

GetAntiVirusState—returns name and version of anti-virus application (if any), version of anti-virus definition file UpdateAntiVirusConfig—installs an updated anti-virus definition file GetFWState—returns name and version of personal firewall application installed (if any), and version of firewall configuration file UpdateFirewallConfig—installs an updated firewall configuration file UpdateVPNConfig—updates the VPN profile GetVPNState—gets the version of the VPN client (if any) and a list of the VPN profiles installed on this device.

RunProcess—runs a process (e.g., already installed on the client) and returns process output RunScript—runs a script (e.g., received from the configuration server) and returns output RunBrowser—starts a web browser and directs it to the specified uniform resource locator (URL)

DisplayError—shows a message to the user, explaining what is required before they will be permitted to gain network access.

DisplayWarning—alerts the user to some problem in their device configuration (this may occur in addition to granting network access)

It will be appreciated, that other embodiments might use a different set or type of messages or commands that may be communicated from the configuration server 42 to the client access device 102 (e.g., HTML). In any case, the execution of the conveyed commands on the client access device 102 may result in at least the configuration of the client access device 102 being communicated to the authentication system 106 and optionally installation of the desired updates, if necessary.

Figure 8:
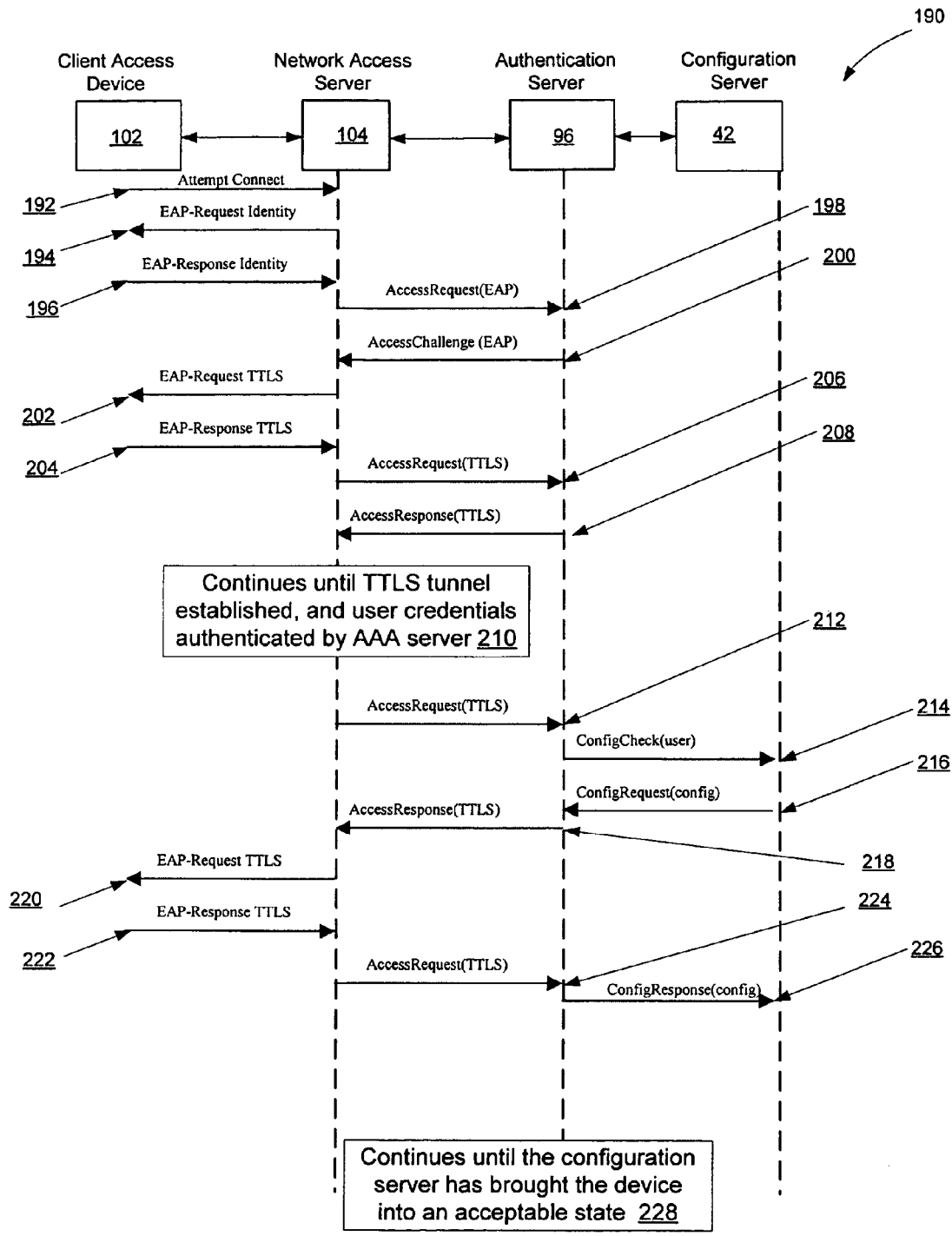
FIG. 8 is an interactive flowchart of a method, according to an exemplary embodiment of the invention, illustrating the communication flow between the client access device and the network.

FIG. 8 is an interactive flowchart of a method 190, according to one embodiment of the present invention, illustrating the communication flow between the exemplary client access device 102 and the exemplary network access system 100. The client access device 102 may attempt to connect to the network access server 104 at a remote geographical location as described above (see operation 192). In response, the network access server 104, as shown at operation 194, may communicate a request for identity using an extensible authentication protocol (EAP) request. At operation 196, the client access device 104 may respond by sending an EAP response. In varying embodiments, the EAP protocol messages may be conveyed over IEEE 802 protocol or Point-to-Point Protocol (PPP), depending on the nature of the connection from the client access device 102 to the network access server 104. At operation 198, the network access server 104 may convey an EAP access request to the authentication server 96. In response to the access request, the authentication server 96, as shown at operation 200, may convey an access challenge (EAP) back to the network access server 104. The network access server 104, at operation 202, then sends an EAP request for the establishment of a Tunnel Transport Layer Security (TTLS) tunnel between the client access device 102 and the authentication system 100. In response thereto, as shown at operation 204, the client access device 102 may send an EAP TTLS message to the network access server 104.

Once the TTLS tunnel has been established, the network access server 104, (see operation 206) may convey an access request within the TTLS tunnel to the authentication server 96. As shown in operation 208, the authentication server 96 may respond within the TTLS tunnel either granting or denying access based on EAP response identity message (see operation 196) that was received from the client access device 102. As block 210 indicates, in one embodiment of the present invention, the method 190 described above with reference to operations 192 through 208 may require several iterations in order to establish a TTLS tunnel and authenticate the user credentials. Although the authentication of the user credentials (see operations 192-208) have been described, by way of example, with reference to EAP and TTLS, it will be appreciated that the invention is not restricted to use of these protocols. Thus, in other embodiments, different protocols may be used to verify the credentials of a user requesting access to a network.

Once the authentication server 96 authenticates the user credentials, the network access server 104, as shown at operation 212, may convey another access request within the tunnel to the authentication server 96. As shown at operation 214, the authentication server 96 may then query the configuration server 42 for any configuration information that may be associated with the user of client access device 102. As discussed above, the configuration information or data may relate to security settings (e.g., operating system settings or the client device 102) and security applications (e.g., anti-virus applications and firewall applications) resident on the client device 102. This information or data may define reference security data. The configuration server 42, in operation 216, may then convey a configuration request command to the authentication server 96. In response thereto, the authentication server 96, in operation 218, may convey an access response, including the configuration request, to the network access server 104. The request is then forwarded, in operation 220, in the form of an EAP request via the TTLS tunnel to the client access device 102. The client access device 102, in operation 222, may reply to the request from the configuration server 42 via the network access server 104 and the authentication server 96, as shown by operations 224 and 226. The configuration server 42 may then process the configuration data (current configuration data) received from the client access device 102 to determine if the current state of the client access device 102 is an acceptable state to grant network access. Thus, the current configuration data may be used to determine whether or not the access device 102 is deemed protected and thus safe from a security attack from the network to which it is connecting.

In one embodiment, the current configuration data extracted from the device 102 may be compared to the reference configuration data associated with the particular device 102 and/or user credentials. In one embodiment, the authentication system 100 may provide updated configuration data to reconfigure the device 102 to meet selected security requirements. Upon determining that an update of the client access device configuration is required, the configuration server 42 may then initiate an upgrade response (as illustrated by way of example in FIGS. 6 and 7) in order to bring the device 102 into an acceptable security state. As illustrated in block 228, in one exemplary embodiment of the invention, operations 216-226 may repeat as many times as necessary to bring the client device 102 into an acceptable security state for network access.

Figure 9:
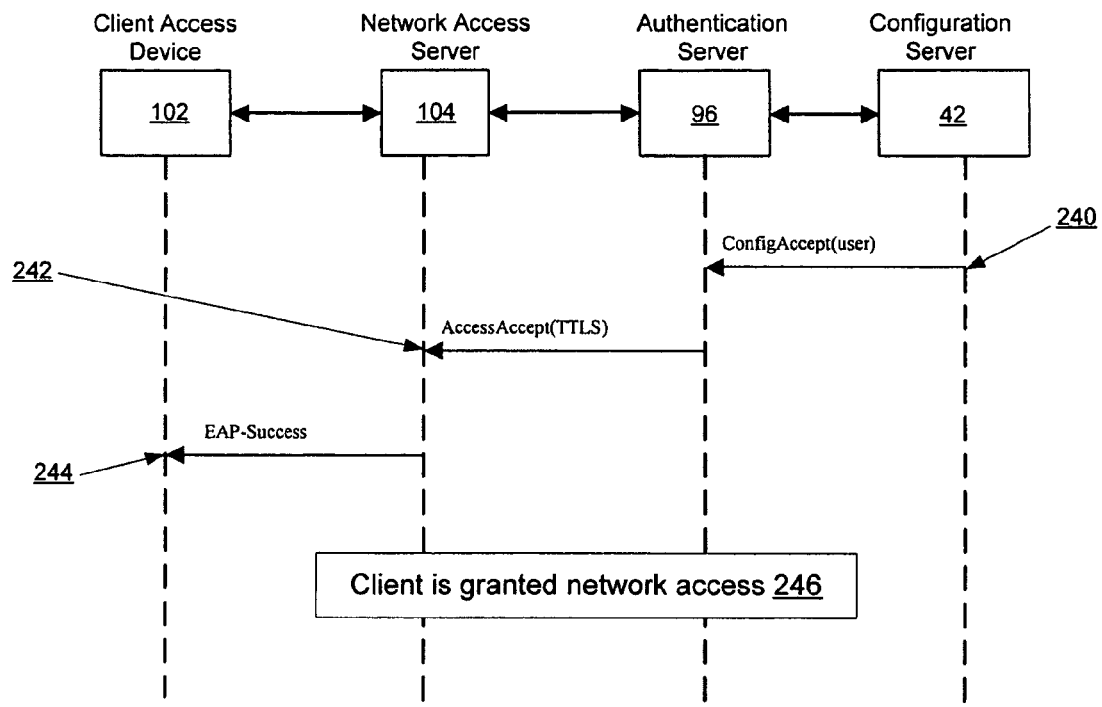
FIG. 9 is an interactive flowchart of a method, according to an exemplary embodiment of the invention, wherein after the client access device is brought into an acceptable state, the client access device is granted network access.

FIG. 9 is an interactive flowchart, according to one exemplary embodiment of the invention, wherein the client access device 102 is granted network access. The operations of FIG. 9 follow on from those of FIG. 8, and in one embodiment, once determined the client access device 102 is brought into an acceptable state, the client access device 102 may be granted network access.

Returning to FIG. 9, the configuration server 42 having determined that the client access device 102 is in an acceptable state, in operations 240 and 242, may convey a configuration accept message to the network access server 104 through the authentication server 96. In response thereto, the network access server 104, in operation 244, may convey a success message to the client access device 102, where after the client access device 102 and its associated user may be granted access to the network (see operation 246).

Figure 10:
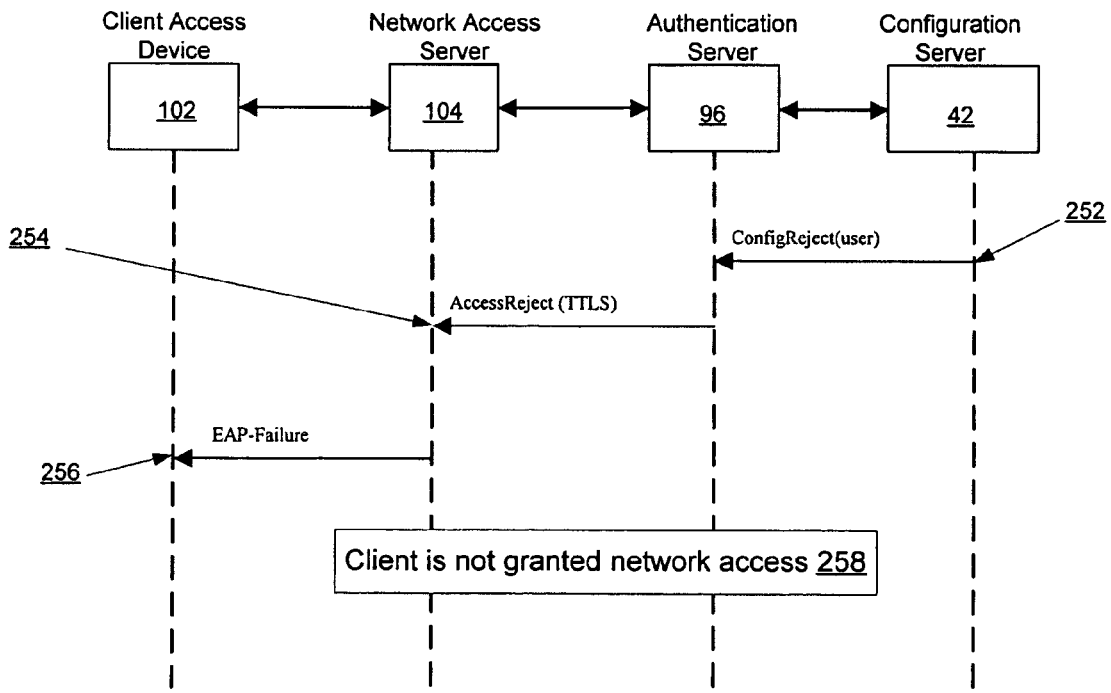
FIG. 10 is an interactive flowchart of a method, according to an exemplary embodiment of the invention, wherein network access to the client access device is denied.

FIG. 10 is an interactive flowchart illustrating, according to one exemplary embodiment of the invention, a denial of network access to client access device 102. The operations of FIG. 10 follow on from those of FIG. 8, and in one embodiment, once determined the client access device 102 cannot be brought into an acceptable state or that the client access device 102 is prohibited for other policy reasons, the client access device 102 is denied network access.

Returning to FIG. 10, upon determining that the client access device 102 cannot be configured such that the device 102 is brought into an acceptable state for network access, the configuration server 42, in operations 252 and 254, conveys a configuration rejection message to the network access server 104 through the authentication server 96. The network access server 104, in operation 256, may send to the client access device 102 an EAP failure message. Consequently, the client access device 102 and its associated user are denied network access. For example, the configuration server may reject the client access device configuration if it is unable to bring the client access device 102 into an acceptable state for network access. The denial of access may be for reasons such as, lack of permission to install new updates at the client access device or general failure of the update process.

Exemplary Computer System

Figure 11:
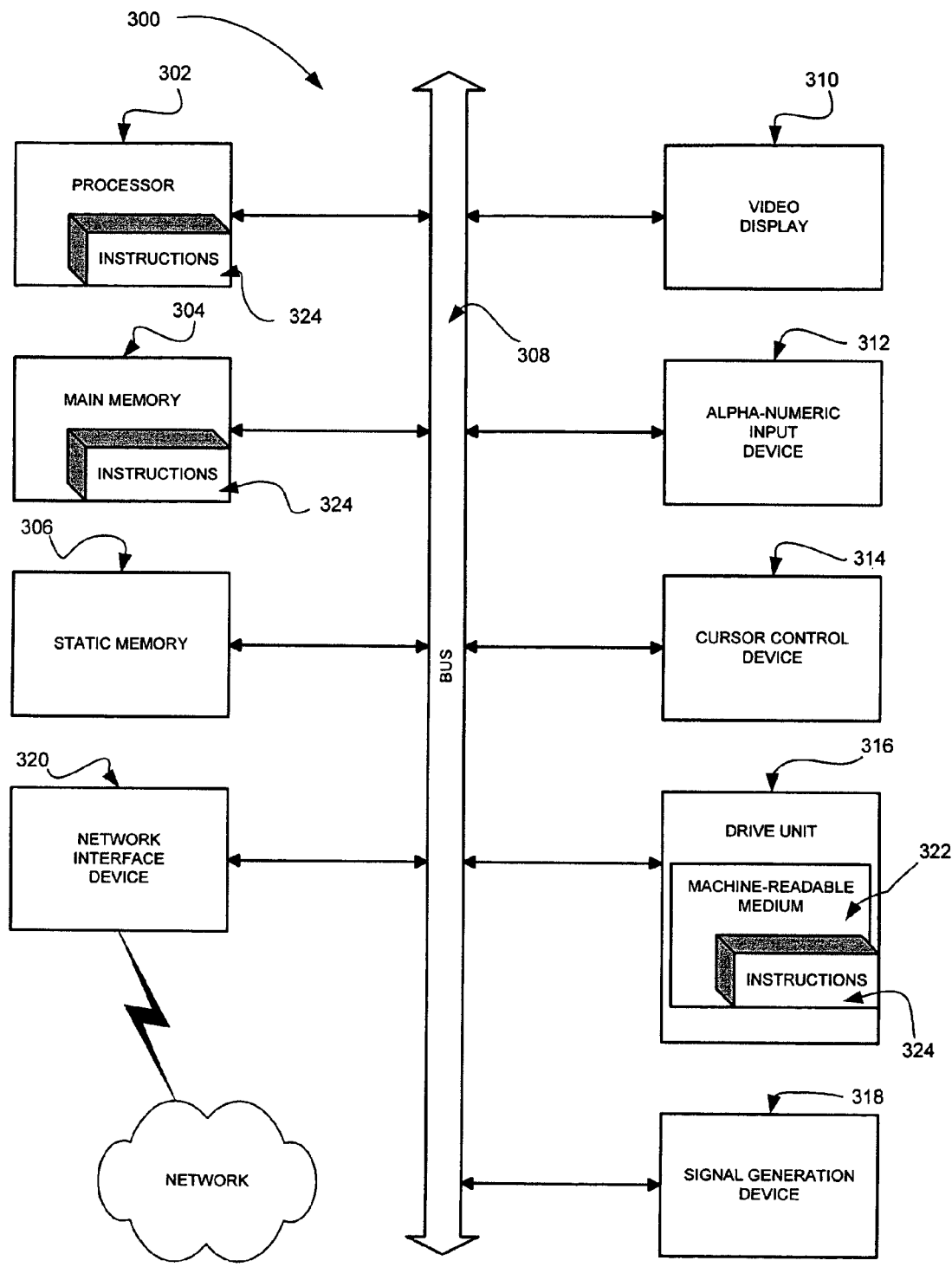
FIG. 11 is a schematic block diagram of an exemplary machine for executing any one or more of the methods described herein.

FIG. 11 shows a diagrammatic representation of machine in the exemplary form of the computer system 300 within which a set of instructions, for causing the machine to implement any one of the methodologies or modules discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 300 is shown to include a processor 302, a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 may include a machine-readable medium 322 on which is stored a set of instructions (software) 324 embodying any one, or all, of the methodologies described above. The software 324 is also shown to reside, completely or at least partially, within the main memory 304 and/or within the processor 302. The software 324 may further be transmitted or received via the network interface device 320. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks.

Thus, a method and system to verify and optionally update the configuration of an access device during authentication are described. In the foregoing detailed description, the invention has been described with reference to specific exemplary embodiments thereof. It will, however, be evident that various modifications and changes may be made thereto without departing from the broader scope and spirit of the invention as set forth in the appended claims. The specification and drawings are, accordingly, to be regarded in an illustrative sense rather than a restrictive sense.

What is claimed is:

1. A method comprising:
  performing, in a first service access provider, operations including,
    receiving an access request from a client access device, the access request requesting access to a network, wherein a user associated with the client access device is a subscriber of a second service access provider, wherein the second service provider is physically distinguished from the first service provider;

establishing a communications link with the client access device to authenticate and authorize the user, including delivering an agent to the client access device, the agent operable to identify the client device configuration;

receiving client device configuration data from the agent over the communications link during an authentication and authorization exchange;

transmitting the client device configuration data destined for the second service access provider, wherein the second service access provider is operable to process the client device configuration data and selectively grant the client access device access to the network based upon the client device configuration data; and receiving an indication about whether the client access device is granted access to the network, the indication originating from the second service access provider.

2. The method of claim 1, wherein determining if the client device configuration data meets predetermined security requirements includes comparing the client device configuration data with reference configuration data.

3. The method of claim 1, wherein the second service access provider is further operable to update the client device configuration data if the client device configuration data fails to meet the predetermined security requirements.

4. The method of claim 3, wherein selectively granting the client access device access to the network includes, denying access to the network if the client device configuration data is not updated.

5. The method of claim 1, wherein the agent is further operable to communicate the client device configuration data to a server of the network.

6. The method of claim 5, which includes, if after the processing of the client device configuration data the client device configuration data requires an update, using the agent to update the client access device with updated configuration data.

7. The method of claim 6, which includes, after updating the client access device, receiving an update result indicator from the agent to confirm that the configuration of the client access device has been updated.

8. The method of claim 1, wherein the establishing of the communications link with the client access device includes communicating a command set, which includes at least one command, to the client access device, the command set operable to identifer the client device configuration data and to communicate the client device configuration data to a server of the network.

9. The method of claim 8, which includes, if after the processing of the client device configuration data the client device configuration data requires an update, using the command set to update the client access device with updated configuration data.

10. The method of claim 9, wherein the command set further includes a first command set to identify and communicate the client device configuration data to the server, and a second command set to update the client access device with the updated configuration data.

11. The method of claim 9, which includes, after updating the client access device, receiving an update result indicator from the client access device to confirm that the configuration of the client access device has been updated.

12. The method of claim 1, the operations further including, after establishing communications with the client access device, transmitting authentication information to the second service access provider, the second service access provider further operable to authenticate the user.

13. The method of claim 12, wherein authenticating the user includes verifying user login information associated with the user attempting access to the network.

14. The method of claim 1, wherein the client device configuration data includes at least one of virus definition data, firewall configuration data, and operating system configuration data.

15. A system to verify configuration data of a client access device requesting access to a packet-switched computer network, the system comprising:

a first service access provider, coupled to the packet-switched computer network, to establish a communications link to the client access device, including delivering an agent to the client access device, the agent operable to identify the client device configuration, via the packet switched computer network to receive, from the client access device, authentication information for a user associated with the client access device and to receive the configuration data from the client access device over the communications link during an authentication and authorization exchange; and a second service access provider to receive said authentication information and the said configuration data from the first service access provider, to process the configuration data, to selectively grant the client access device access to the network based upon the configuration data, and to originate an indication whether the client access device is granted access to the network: and wherein the second service provider is physically distinguished from the first service provider and the client access device is a subscriber of the second service access provider.

16. The system of claim 15, wherein the second service access provider includes a configuration server to process the client device configuration data such that the configuration server determines if the client device configuration data meets predetermined security requirements.

17. The system of claim 16, wherein the configuration server compares the client device configuration data with reference configuration data to determine if the client device configuration data meets predetermined security requirements.

18. The system of claim 16, wherein the configuration server, after the client device configuration data is processed, updates the client device configuration data.

19. The system of claim 18, wherein the configuration server denies network access to the client access device if the client device configuration data is not updated.

20. The system of claim 16, wherein to establish the communications link with the client access device, the second service access provider communicates an agent to the client access device, the agent operable to identify the client device configuration data and to communicate the client device configuration data to at least one of the second service access provider and the configuration server.

21. The system of claim 20, wherein if after the processing of the client device configuration data the client device configuration data requires an update, the configuration server being configurable to use the agent to update client device configuration data with updated configuration data.

22. The system of claim 21, wherein after the agent updates the client access device, the configuration server receives an update result indicator from the agent to confirm that the configuration of the client device has been updated.

23. The system of claim 16, wherein to establish the communications link with the client access device, the first service access provider communicates a command set to the client access device, the command set operable to identify the client device configuration data and to communicate the client device configuration data to at least one of the first service access provider and the configuration server.

24. The system of claim 23, wherein if after the processing of the client device configuration data, the client device configuration data requires an update, the configuration server is operable to further use the command set to update client device configuration data with updated configuration data.

25. The system of claim 24, wherein after the configuration server updates the client access device, the configuration server receives an update result indicator from the client access device to confirm that the client configuration has been updated.

26. The system of claim 23, wherein the command set further includes a first command set to identify and communicate the client device configuration data to the server, and a second command set to update the client access device with the updated configuration data.

27. The system of claim 15, wherein the second service access provider includes an authentication server to authenticate and authorize a user associated with the client access device.

28. The system of claim 15, wherein the client device configuration data includes at least one of virus definition data, firewall configuration data, and operating system configuration data.

29. A machine readable storage medium storing a set of instructions that, when executed by a machine, cause the machine to:
    perform, in a first service access provider, following operations:
        receiving an access request from a client access device, the access request requesting access to a network, wherein a user associated with the client access device is a subscriber of a second service access provider, wherein the second service provider is physically distinguished from the first service provider; establishing a communications link with a client access device including delivering an agent to the client access device, the agent operable to identify the client device configuration to authenticate and authorize the user associated with the client access device;
        receiving client device configuration data from device over the communications link during an authentication and authorization exchange;
        transmitting the client device configuration data destined for the second service access provider, wherein the second service access provider is operable to process the client device configuration data and to selectively grant the client access device access to the network based upon the client device configuration data; and
        receiving an indication about whether the client access device is granted access to the network, the indication originating from the second service access provider.

30. The machine readable medium of claim 29, wherein after the processing of the client device configuration data, the client device configuration data is updated with updated configuration data.

31. A method to manage access to a network from a client access device, the method comprising:
    requesting access to the network, the requesting involving a first service access provider and a second service access provider,
    authenticating a user associated with the client access device in an authentication and authorization exchange, at the first service provider, involving an agent delivered to the client access device, said delivered agent operable to identify the client device configuration data, wherein the user is a subscriber of the second service access provider;
    communicating client device configuration data to the second service access provider via said delivered agent, wherein the client device configuration data includes security setting status data received from executables operating on the client device;
    processing the configuration data, by the second service access provider;
    receive a verification response from the second service access provider via the first service access provider; and
    if the user is authenticated and the verification response from the second service access provider indicates acceptance of the client device configuration data, access the network via the first service provider.

32. The method of claim 31, wherein prior to receiving the verification response, updated configuration data is received from the second service access provider via the first service access provider, the updated configuration data to replace the client device configuration data.

33. A machine readable storage medium storing a set of instructions that, when executed by a machine, cause the machine to:
    request, from a first service access provider, access to a network, the requesting involving a first service access provider and a second service access provider, wherein the second service provider is physically distinguished from the first service provider;
    authenticate and authorize a user associated with the request in an authentication and authorization exchange, at the first service provider, involving an agent delivered to the client access device, said delivered agent operable to identify the client device configuration data, wherein the user is a subscriber of the second service access provider;
    communicate client device configuration data to the second service access provider via the agent; wherein the client device configuration data includes security setting status data received from executables operating on the client device;
    process the configuration data, by the second service access provider,
    receive a verification response from the second service access provider via the first service access provider; and
    if the user is authenticated and the verification response from the second service access provider indicates acceptance of the client device configuration data, access the network via the first service provider.

34. The machine readable medium of claim 33, wherein prior to receiving a verification response, updated configuration data is received from the second service access provider to replace the client device configuration data.

* * * * *